United States Patent
Sakai

(10) Patent No.: US 9,513,841 B2
(45) Date of Patent: Dec. 6, 2016

(54) INFORMATION PROCESSING DEVICE, INFORMATION PROCESSING METHOD, PROGRAM, AND INFORMATION STORAGE MEDIUM FOR MANAGING AND REPRODUCING PROGRAM EXECUTION CONDITION DATA

(75) Inventor: Masaharu Sakai, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 66 days.

(21) Appl. No.: 14/362,211

(22) PCT Filed: Aug. 13, 2012

(86) PCT No.: PCT/JP2012/070624
§ 371 (c)(1),
(2), (4) Date: Jun. 2, 2014

(87) PCT Pub. No.: WO2013/088782
PCT Pub. Date: Jun. 20, 2013

(65) Prior Publication Data
US 2014/0337588 A1    Nov. 13, 2014

(30) Foreign Application Priority Data
Dec. 13, 2011    (JP) ................. 2011-272826

(51) Int. Cl.
*G06F 13/00*    (2006.01)
*G06F 9/44*     (2006.01)
(Continued)

(52) U.S. Cl.
CPC .......... *G06F 3/0655* (2013.01); *G06F 3/0482* (2013.01); *G06F 3/0488* (2013.01); *G06F 3/0604* (2013.01);
(Continued)

(58) Field of Classification Search
None
See application file for complete search history.

(56) References Cited

U.S. PATENT DOCUMENTS

| 4,907,150 A * | 3/1990 | Arroyo ..................... G06F 1/26 713/323 |
| 6,553,400 B1 | 4/2003 | Fukuda |

(Continued)

FOREIGN PATENT DOCUMENTS

| JP | 1997097188 A | 4/1997 |
| JP | 2000250667 A | 9/2000 |

(Continued)

OTHER PUBLICATIONS

Office Action for corresponding JP Application No. 2013-549138, dated Aug. 11, 2015.

(Continued)

*Primary Examiner* — Idriss N Alrobaye
*Assistant Examiner* — Richard B Franklin
(74) *Attorney, Agent, or Firm* — Matthew B. Dernier, Esq.

(57) ABSTRACT

When execution of a program is started, in a case where a memory region used by the program when the execution of the program was stopped is usable, the past execution conditions of the program to be reproduced are enabled without reading in data disposed in the memory region used by the program, which data was stored when the execution of the program was stopped. When the execution of the program is stopped, a stop and end managing section performs control to store at least a part of the data disposed in the memory region used by the program in association with the program while retaining the data.

11 Claims, 5 Drawing Sheets

(51) Int. Cl.
*G06F 3/06* (2006.01)
*G06F 9/46* (2006.01)
*G06F 9/48* (2006.01)
*G06F 3/0488* (2013.01)
*G06F 3/0482* (2013.01)

(52) U.S. Cl.
CPC ............. *G06F 3/0673* (2013.01); *G06F 9/461* (2013.01); *G06F 9/485* (2013.01)

(56) References Cited

U.S. PATENT DOCUMENTS

| | | | |
|---|---|---|---|
| 7,506,265 B1* | 3/2009 | Traut | G06F 9/4443 715/763 |
| 7,805,598 B2* | 9/2010 | Dandekar | G06F 11/0793 713/1 |
| 8,875,160 B2* | 10/2014 | Hunt | G06F 9/45558 718/1 |
| 2005/0221891 A1 | 10/2005 | Kamiya | |
| 2006/0070085 A1 | 3/2006 | Bao | |
| 2008/0082845 A1 | 4/2008 | Morisawa | |
| 2010/0005475 A1 | 1/2010 | Shirakawa | |
| 2010/0070678 A1* | 3/2010 | Zhang | G06F 9/461 711/6 |
| 2011/0016417 A1 | 1/2011 | Shiplacoff | |

FOREIGN PATENT DOCUMENTS

| | | |
|---|---|---|
| JP | 2001318744 A | 11/2001 |
| JP | 2005293354 A | 10/2005 |
| JP | 2007304914 A | 11/2007 |
| JP | 2008090436 A | 4/2008 |
| JP | 2009080821 A | 4/2009 |
| JP | 2009129026 A | 6/2009 |
| JP | 2011158967 A | 8/2011 |

OTHER PUBLICATIONS

Christopher Allen, "101 for iPhone application and website development", Nikkei Business Publications, Inc., Koji Segawa, 5 pages, see p. 206, (Apr. 19, 2010) (for relevancy see office action for corresponding JP Application No. 2013-549138, dated Aug. 11, 2015 cited above).

International Preliminary Report on Patentability and Written Opinion for corresponding application PCT/2012/070624, dated Jun. 26, 2014.

International Search Report for corresponding application PCT/2012/070624. dated Sep. 4, 2012.

Office Action for corresponding JP Application No. 2013-549138, dated Feb. 17, 2015.

Kikusato Chigusa, Evolutionary Points of iOS 4 Installed in UNIX iPhone 4, Cellphone Owned by 100 Million People—Part 1, From iPhone Os to iOS, What Is New About iOS 4?, Monthly ASCII. technologies, ASCII Media Works Inc., vol. 15, No. 10 (consecutive vol. No. 174), 9 pages, Aug. 24, 2010. (for relevancy see p. 8 of JP Office Action for JP Application 2013-549138, dated Feb. 17, 2015 cited above).

Search Report for corresponding EP Application No. EP12858589.0, 6 pages, dated Feb. 26, 2016.

* cited by examiner

INFORMATION PROCESSING DEVICE, INFORMATION PROCESSING METHOD, PROGRAM, AND INFORMATION STORAGE MEDIUM FOR MANAGING AND REPRODUCING PROGRAM EXECUTION CONDITION DATA

TECHNICAL FIELD

The present invention relates to an information processing device, an information processing method, a program, and an information storage medium.

BACKGROUND ART

There is a technology in which when a program being executed is ended, the program stores save data related to the program.

SUMMARY

Technical Problems

When the execution of a program is stopped (for example when the program is set in a suspended state or when the program is ended after passing through a suspended state), and control is performed to store at least a part of data disposed in a memory region used by the program and the memory region is released, it is necessary to read in the stored data and dispose the data in the memory region used by the program in order to reproduce the past execution conditions of the program when thereafter starting the execution of the program.

Here, when the execution of the program is stopped, and the data disposed in the memory region used by the program is retained, the past execution conditions of the program can be reproduced without the trouble of reading in the stored data as described above if the data is usable in starting the execution of the program.

The present invention has been made in view of the above problems. It is an object of the present invention to, when execution of a program is started, in a case where a memory region used by the program when the execution of the program was stopped is usable, enable the past execution conditions of the program to be reproduced without reading in data disposed in the memory region used by the program, which data was stored when the execution of the program was stopped.

Solution to Problems

In order to solve the above problems, according to the present invention, there is provided an information processing device including storing control means configured to, when execution of a program is stopped, perform control to store at least a part of data disposed in a memory region used by the program in association with the program while retaining the data.

In addition, according to the present invention, there is provided another information processing device including readout control means configured to, when execution of a program is started, in a case where data controlled to be stored in association with the program while retained in a memory region used by the program when the execution of the program was stopped is stored, perform control to read out the data and dispose the data in the memory region used by the program.

In addition, according to the present invention, there is provided yet another information processing device including: storing control means configured to, when execution of a program is stopped, perform control to store at least a part of data disposed in a memory region used by the program in association with the program while retaining the data; and readout control means configured to, when the execution of the program is started, in a case where the data controlled to be stored in association with the program by the storing control means is stored, perform control to read out the data and dispose the data in the memory region used by the program.

In addition, according to the present invention, there is provided an information processing method including a storing control step of, when execution of a program is stopped, performing control to store at least a part of data disposed in a memory region used by the program in association with the program while retaining the data.

In addition, according to the present invention, there is provided another information processing method including a readout control step of, when execution of a program is started, in a case where data controlled to be stored in association with the program while retained in a memory region used by the program when the execution of the program was stopped is stored, performing control to read out the data and dispose the data in the memory region used by the program.

In addition, according to the present invention, there is provided a program for making a computer function as storing control means configured to, when execution of a program is stopped, perform control to store at least a part of data disposed in a memory region used by the program in association with the program while retaining the data.

In addition, according to the present invention, there is provided another program for making a computer function as readout control means configured to, when execution of a program is started, in a case where data controlled to be stored in association with the program while retained in a memory region used by the program when the execution of the program was stopped is stored, perform control to read out the data and dispose the data in the memory region used by the program.

In addition, according to the present invention, there is provided a computer readable information storage medium storing a program, the program making a computer function as storing control means configured to, when execution of a program is stopped, perform control to store at least a part of data disposed in a memory region used by the program in association with the program while retaining the data.

In addition, according to the present invention, there is provided another computer readable information storage medium storing a program, the program making a computer function as readout control means configured to, when execution of a program is started, in a case where data controlled to be stored in association with the program while retained in a memory region used by the program when the execution of the program was stopped is stored, perform control to read out the data and dispose the data in the memory region used by the program.

According to the present invention, when a program is stopped, control is performed to store at least a part of data disposed in a memory region used by the program in association with the program while retaining the data. Thus, when the execution of the program is started, in a case where the memory region used by the program when the execution of the program was stopped is usable, the past execution conditions of the program are reproduced without reading in the data disposed in the memory region used by the program, which data was stored when the execution of the program was stopped.

In one mode of the present invention, when the execution of the program is stopped, the storing control means performs control to store data disposed in a region within a range of predetermined logical addresses, the region being used by the program.

In addition, in one mode of the present invention, when the execution of the program is stopped, the storing control means performs control to store the data disposed in the memory region used by the program in a case where the data is changed from data stored when the execution of the program was stopped last time, and does not perform control to store the data disposed in the memory region used by the program in a case where the data is not changed from the data stored when the execution of the program was stopped last time.

In addition, in one mode of the present invention, in a case where the information processing device ended abnormally, when the information processing device is started after ending abnormally, the storing control means erases the data controlled to be stored when the execution of the program is stopped.

In addition, in one mode of the present invention, the information processing device further includes execution start control means configured to secure the memory region used by the program in a case where the memory region used at a time of a past execution of the program is released when the execution of the program is started. In a case where the data controlled to be stored in association with the program by the storing control means is stored when the execution start control means secures the memory region, the readout control means performs control to read out the data and dispose the data in the memory region.

DESCRIPTION OF EMBODIMENT

One embodiment of the present invention will hereinafter be described in detail with reference to the drawings.

Figure 1:
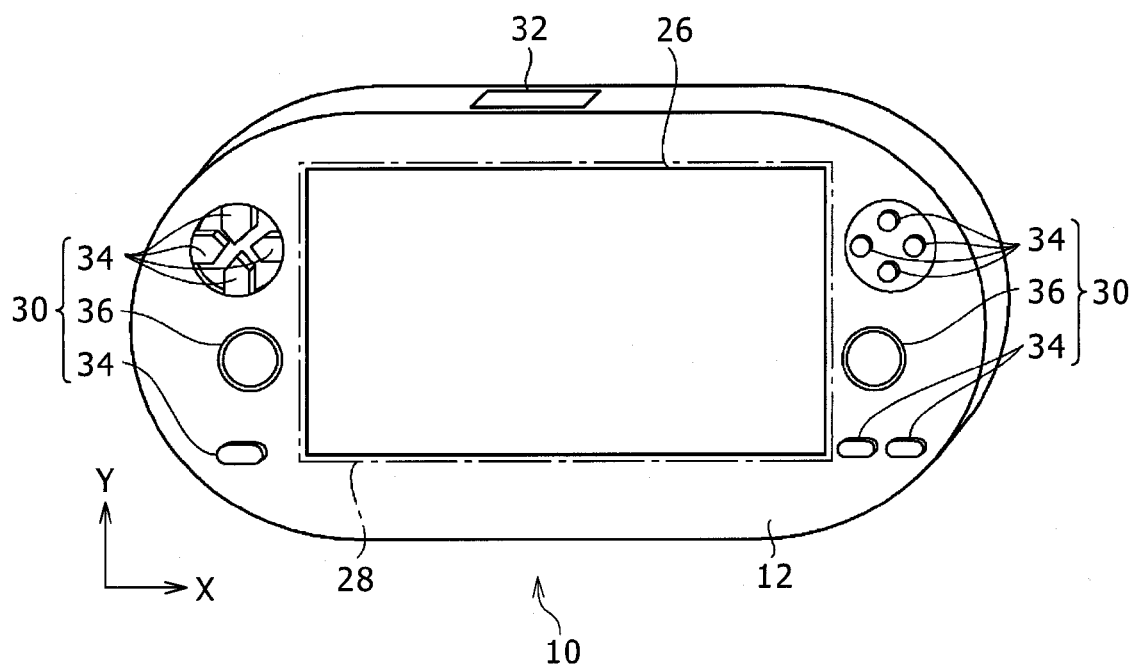
FIG. 1 is a perspective view of an example of an external appearance of an information processing device according to one embodiment of the present invention.
Figure 2:
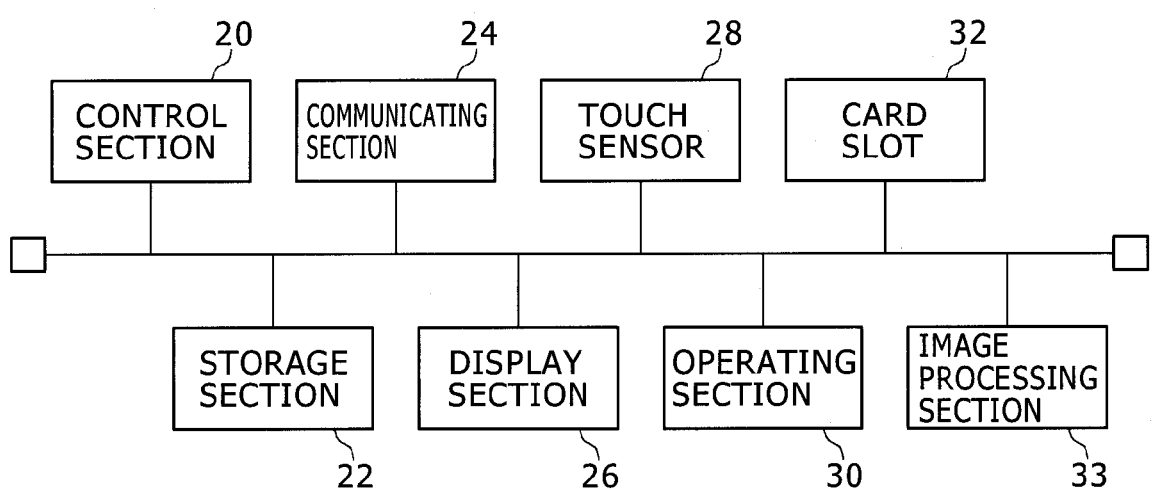
FIG. 2 is a block diagram showing an example of hardware configuration of the information processing device according to the embodiment of the present invention.

FIG. 1 is a perspective view of an example of an external appearance of an information processing device 10 according to one embodiment of the present invention. FIG. 2 is a block diagram showing an example of a hardware configuration of the information processing device 10 shown in FIG. 1. Suppose that the information processing device 10 according to the present embodiment is for example a portable type device such as a portable type game machine or the like.

As shown in FIG. 1, a casing 12 of the information processing device 10 according to the present embodiment has a flat shape as a whole. As shown in FIG. 1 and FIG. 2, the information processing device 10 according to the present embodiment includes a control section 20, a storage section 22, a communicating section 24, a display section 26, a touch sensor 28, an operating section 30, a card slot 32, an image processing section 33, and the like. These elements are connected to each other via a bus.

The control section 20 is for example a CPU or the like. The control section 20 performs various kinds of information processing according to a program stored in the storage section 22. The storage section 22 is a memory element such for example as a RAM or a ROM. The storage section 22 stores the program executed by the control section 20 and various kinds of data. The storage section 22 also functions as a work memory for the control section 20. The communicating section 24 is for example a network interface (specifically a wireless LAN module, for example). The communicating section 24 transmits information to another information processing device 10, a server (not shown) on the Internet, and the like according to an instruction input from the control section 20. In addition, the communicating section 24 outputs received information to the control section 20.

The display section 26 is various kinds of devices for displaying an image, such for example as a liquid crystal display panel and an organic EL display panel. As shown in FIG. 1, in the present embodiment, the display section 26 is disposed in the front surface of the casing 12, and the screen of the display section 26 has a substantially rectangular shape. Hereinafter, the horizontal direction (direction of width) of the screen will be set as an X-axis direction, and a direction from a left to a right as viewed from the front surface of the screen will be set as an X-axis positive direction. In addition, the vertical direction (direction of height) of the screen will be set as a Y-axis direction, and a direction from a bottom to a top as viewed from the front surface of the casing 12 will be set as a Y-axis positive direction.

The touch sensor 28 has a substantially rectangular detecting surface having a shape and a size that correspond to the screen. When an object comes into contact with the detecting surface, the touch sensor 28 detects the contact position of the object. In addition, in the present embodiment, the touch sensor 28 sequentially detects the contact position of the object at predetermined time intervals. As shown in FIG. 1, in the present embodiment, the detecting surface of the touch sensor 28 is disposed on the front surface of the casing 12 so as to be superposed on the screen of the display section 26. Incidentally, suppose in the following description that a user performs operating input by bringing a finger of the user into contact with the touch sensor 28. However, without being limited to this, the user may perform operating input by bringing an object held in a hand of the user, such as a stylus or the like, into contact with the detecting surface. In addition, the touch sensor 28 does not necessarily detect the position of the object only when the object comes into contact with the detecting surface, but may detect the position of the object with respect to the detecting surface when the object is brought into proximity to a detectable range on the detecting surface. The touch sensor 28 may be of any type such for example as a capacitance type, a pressure sensitive type, or an optical type, as long as the touch sensor 28 is a device capable of detecting the position of the object on the detecting surface. Incidentally, the information processing device 10 may include a touch sensor 28 disposed on the back surface of the casing 12 so as to be opposed to the touch sensor 28 disposed on the front surface of the casing 12.

The operating section 30 is for example a kind of operating member used by the user to perform operating input to the information processing device 10 together with the touch sensor 28. FIG. 1 shows buttons 34 and analog sticks 36 disposed on the front surface of the casing 12 of the information processing device 10 as an example of operating members forming the operating section 30. Incidentally, the information processing device 10 may include for example a switch and a button 34 disposed on the upper side surface of the casing 12 as operating members forming the operating section 30.

The card slot 32 is a slot into and from which an information storage medium such as various kinds of memory cards and the like can be inserted and removed. According to an instruction from the control section 20, the card slot 32 reads a program, data, and the like recorded on the information storage medium such as a memory card or the like inserted in the card slot 32, and writes data to the information storage medium such as a memory card or the like inserted in the card slot 32. In the present embodiment, the card slot 32 is disposed in the upper side surface of the casing of the information processing device 10. Incidentally, the information processing device 10 may include a plurality of card slots 32, and the plurality of card slots 32 may allow information storage media of standards different from each other to be inserted into and removed from the plurality of card slots 32.

The image processing section 33 includes for example a GPU and a frame buffer memory. The image processing section 33 renders an image to be displayed on the display section 26 according to an instruction output by the control section 20. As a concrete example, the image processing section 33 includes a frame buffer memory corresponding to the display region of the display section 26, and the GPU writes the image to the frame buffer memory at predetermined time intervals according to the instruction from the control section 20. Then, the image written in the frame buffer memory is converted into a video signal in predetermined timing to be displayed on the display section 26.

The information processing device 10 according to the present embodiment for example stores a plurality of programs such as a game program and the like in advance in the storage section 22 and on an information storage medium inserted in the card slot 32 (which information storage medium will hereinafter be referred to as an inserted medium). In the present embodiment, the programs stored in the storage section 22 and on the inserted medium each belong to a classification of either a first kind of program (hereinafter referred to as a large program) or a second kind of program (hereinafter referred to as a mini-program). The information processing device 10 according to the present embodiment does not execute two or more large programs simultaneously. An example of programs classified as large programs includes a game program or the like. An example of programs classified as mini-programs includes a program for viewing photographs, a program as a music player, or the like. However, these classifications are a mere example. For example, there may be a game program classified as a mini-program, and there may be a program for viewing photographs or a program as a music player which program is classified as a large program.

In addition, in the present embodiment, the programs stored in the storage section 22 and on the inserted medium each belong to a classification of either a foreground program or a background program. A foreground program is a program executed in the foreground, and refers to for example a program that can be controlled to be started or stopped via the screen or the like by the user. A background program is a program executed in the background, and refers to for example a program started when the information processing device 10 is started, or controlled to be started or stopped by another program.

In the present embodiment, the programs stored in the storage section 22 and on the inserted medium each correspond to either a large program as a foreground program, a large program as a background program, a mini-program as a foreground program, or a mini-program as a background program.

Figure 3:
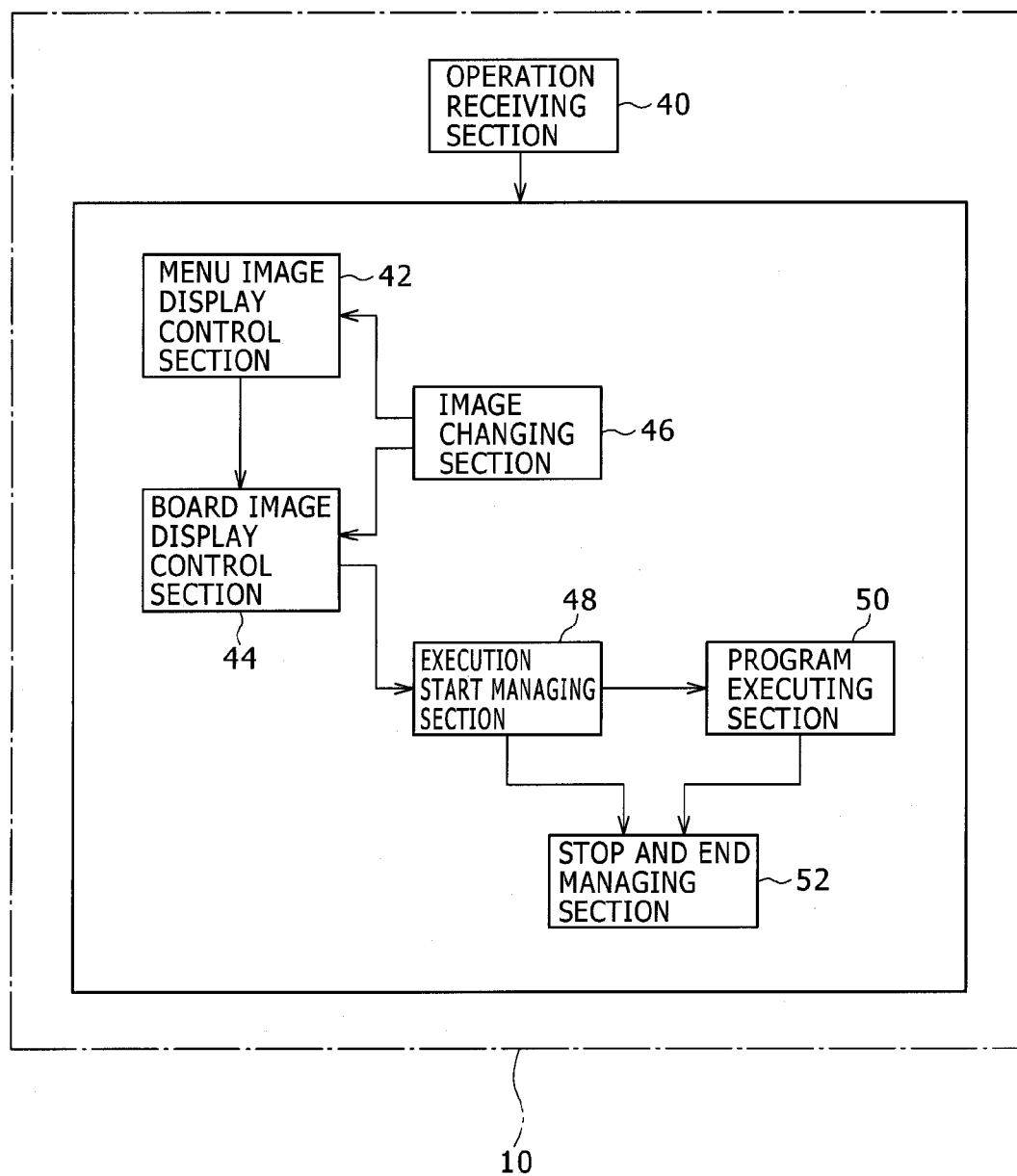
FIG. 3 is a functional block diagram showing an example of functions implemented by the information processing device according to the embodiment of the present invention.

FIG. 3 is a functional block diagram showing an example of functions implemented by the information processing device 10 according to the present embodiment. As shown in FIG. 3, the information processing device 10 functionally includes an operation receiving section 40, a menu image display control section 42, a board image display control section 44, an image changing section 46, an execution start managing section 48, a program executing section 50, and a stop and end managing section 52. These functions are implemented by executing a program according to the present embodiment in the information processing device 10 as a computer. This program may be downloaded from another computer via a communicating interface by way of a computer communication network and provided to the information processing device 10, or may be stored on a computer readable information storage medium such as an optical disk (for example a CD-ROM, a DVD-ROM, a Blu-ray Disk, or the like), a USB memory, a memory card, or the like and provided from the information storage medium to the information processing device 10.

The operation receiving section 40 receives an instruction operation on the touch sensor 28 or the operating section 30 by the user. In particular, in the present embodiment, the user performs operating input to the information processing device 10 by for example bringing a finger of the user into contact with the detecting surface of the touch sensor 28, or sliding the finger in a state of the finger being in contact with the detecting surface. An operation by the user of making the finger in contact with one point on the detecting surface for only a short time will hereinafter be referred to as a tap operation. When a tap operation is performed, the operation receiving section 40 outputs the position of the tap operation (specifically, for example, the X-coordinate value and the Y-coordinate value of the position within the detecting surface with which position the user makes the finger in contact). In addition, an operation by the user of bringing the finger in contact with one point on the detecting surface, moving the finger linearly in some direction on the detecting surface with the contact position as a starting point, and then separating the finger will hereinafter be referred to as a slide operation. When a slide operation is performed, the information processing device 10 performs various kinds of information processing according to the operation by the user of moving the finger in the slide operation. That is, the information processing device 10 receives a direction instruction on the basis of the slide operation.

Figure 4:
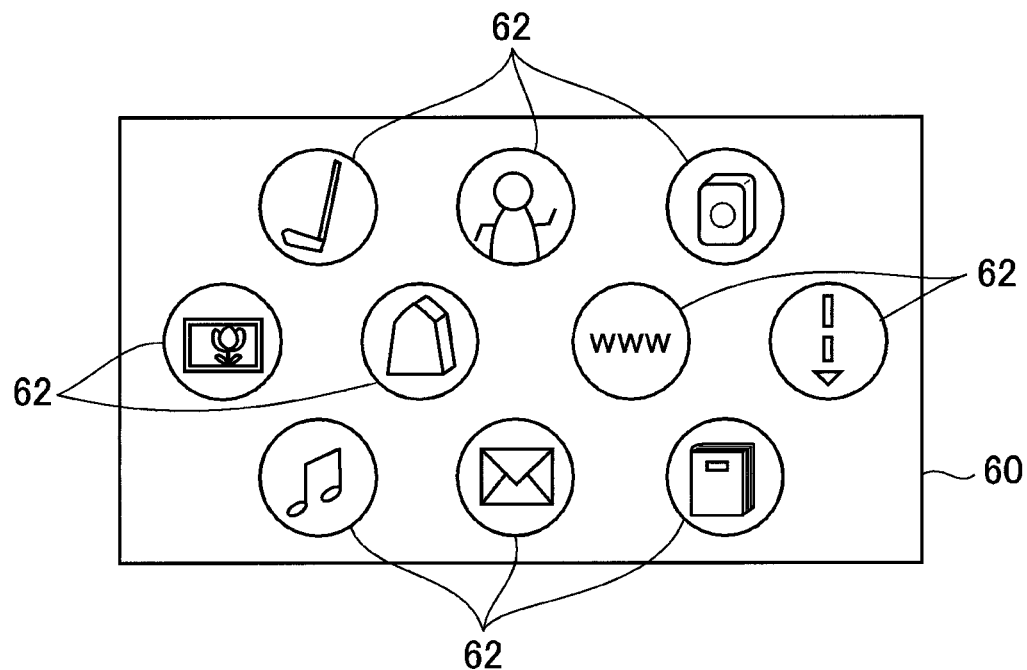
FIG. 4 is a diagram showing an example of a screen displaying a menu image.

The menu image display control section 42 performs control to display a menu image 60 on the screen in predetermined timing such for example as at a time of a start of the information processing device 10 or when the user gives an instruction for menu display. FIG. 4 is a diagram showing an example of the screen displaying the menu image 60. The menu image 60 is an image presented to allow the user to select a program (foreground program in the present embodiment), and is an image including a plurality of menu item images 62 as objects for selection by the user. Each of the menu item images 62 is for example an icon image or the like indicating a foreground program stored in the storage section 22 or on the inserted medium. Suppose in the present embodiment that menu item images 62 associated with foreground programs as large programs and menu item images 62 associated with foreground programs as mini-programs are included within the menu image 60. In FIG. 4, 10 menu item images 62 each associated with a foreground program are included in the menu image 60.

In a state of the menu image 60 being displayed, the user performs an operation of selecting a program by tapping a position where one of the menu item images 62 is displayed. Specifically, the menu image display control section 42 identifies the X-Y coordinates of the tapped position within the screen when receiving the tap operation by the user. The menu image display control section 42 then identifies the menu item image 62 displayed at the position. The menu image display control section 42 then identifies the foreground program associated with the identified menu item image 62. The foreground program is thus selected.

Figure 6:
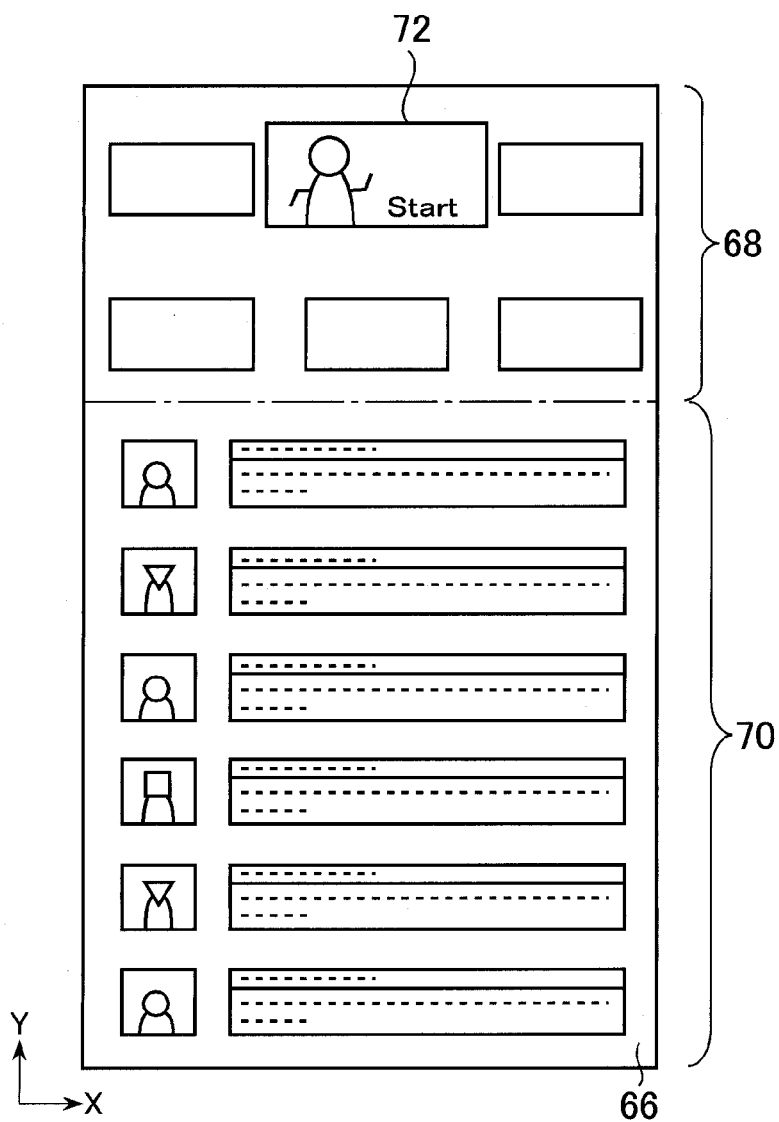
FIG. 6 is a diagram showing an example of a program-related image.

The menu image display control section 42 then instructs the board image display control section 44 to generate an image in which information related to the selected foreground program is disposed (which image will hereinafter be referred to as a program-related image 66). FIG. 6 is a diagram showing an example of the program-related image 66.

Figure 5:
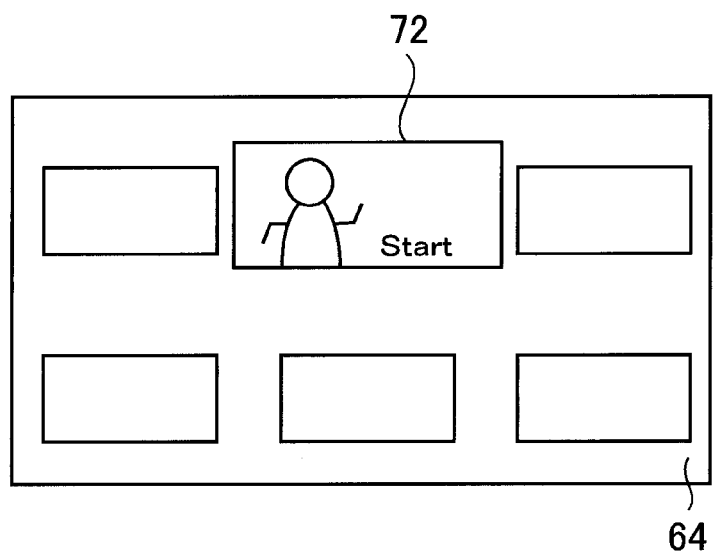
FIG. 5 is a diagram showing an example of the screen displaying a board image.

When the user selects one of the programs in a state of the menu image 60 being displayed on the screen, the board image display control section 44 performs control to display an image related to the selected program on the screen. The image whose display on the screen is controlled by the board image display control section 44 will hereinafter be referred to as a board image 64. FIG. 5 is a diagram showing an example of the screen displaying the board image 64. In the present embodiment, the board image display control section 44 generates the program-related image 66 corresponding to the foreground program selected by the user, and displays a part or the whole of the program-related image 66 as the board image 64 on the screen.

As shown in FIG. 5 and FIG. 6, the board image 64 according to the present embodiment is an image showing a part or the whole of the program-related image 66, in which a plurality of display elements related to the corresponding foreground program are disposed. In the present embodiment, the horizontal direction of the program-related image 66 will be set as an X-axis direction, and a direction of going from a left to a right will be set as an X-axis positive direction. In addition, the vertical direction of the program-related image 66 will be set as a Y-axis direction, and a direction of going from a bottom to a top will be set as a Y-axis positive direction.

Suppose that the program-related image 66 according to the present embodiment is a rectangular region extending along a predetermined scrolling direction (for example, the Y-axis direction in the present embodiment), and that a side of the program-related image 66 which side extends in the Y-axis direction is longer than a length in the vertical direction of the screen of the display section 26. Therefore, the board image display control section 44 cannot display the whole of the program-related image 66 on the screen at a time, but displays only a partial area of the program-related image 66 as the board image 64 on the screen. In the present embodiment, the area actually displayed on the screen (display object area) within the program-related image 66 moves according to a scrolling instruction by the user. Specifically, for example, the user performs a slide operation on the touch sensor 28 in line with the scrolling instruction, whereby the board image display control section 44 moves the display object area within the program-related image 66. The board image display control section 44 then displays a part included in the display object area after the movement in the program-related image 66 as the board image 64 on the screen. Incidentally, the size and shape of the display object area corresponds to the size of the screen. In addition, when the board image display control section 44 first displays the board image 64, the board image display control section 44 may perform control so as to include a predetermined position such for example as an uppermost edge of the program-related image 66 in the display object area.

In addition, as illustrated in FIG. 6, the program-related image 66 in the present embodiment includes two partial regions, that is, a program information region 68 and a communication region 70. The program information region 68 is a region in which information prepared by an entity as a provider of the foreground program or the like is disposed. The communication region 70 is a region in which the contents of messages posted by a plurality of users in relation to the foreground program associated with the program-related image 66 are disposed. The communication region 70 is used to exchange information between users, for example.

In the present embodiment, the board image display control section 44 also manages the information of display elements disposed within the program-related image 66. Specifically, when a foreground program is selected within the menu image 60, the board image display control section 44 obtains the information of display elements to be included in a program-related image 66 to be newly generated. The board image display control section 44 may obtain for example static information stored in the storage section 22 or on the inserted medium (an image indicating a link to the website of the provider of the program, a moving image such as promotional video of the foreground program, or the like), and dispose the static information in the program information region 68. In addition, the board image display control section 44 may obtain for example information notifying an event related to the foreground program as a game program, update information of a related website, information about a related product, released information about a patch or an additional program, or the like from an external server via a network such as the Internet or the like, and dispose the information in the program information region 68. Suppose that in this case, information (for example a URL) about a destination from which to obtain the above-described information related to the foreground program is stored in the storage section 22 or on the inserted medium in association with information identifying the foreground program.

In the present embodiment, the board image display control section 44 also obtains the information of display elements to be disposed in the communication region 70 from the outside via a network. Specifically, for example, the user of the information processing device 10 can post a message related to the program executed by the information processing device 10 to a predetermined communication system via a communication network such as the Internet or the like. The information processing device 10 according to the present embodiment stores information (URL or the like) identifying the communication system as a destination to which to post the message in the storage section 22 or on the inserted medium in association with the foreground program. The information processing device 10 according to the present embodiment refers to this information, and transmits the message input by the user to the communication system. When generating the program-related image 66 associated with the foreground program, the board image display control section 44 accesses the above-described communication system to obtain message information posted in the past in relation to the foreground program. The board image display control section 44 then generates, as a part of the program-related image 66, an image of the communication region 70 in which display elements showing the contents of obtained messages and speakers of the messages are arranged.

In addition, at predetermined time intervals, the board image display control section 44 may obtain a newly arrived message associated with the foreground program from the external server or the communication system, and update the program-related image 66 associated with the foreground program such that the newly arrived message is included in the program-related image 66. In addition, when the external server or the communication system has received a newly arrived message associated with the foreground program, the external server or the communication system may notify the newly arrived message to the information processing device 10. The board image display control section 44 may then update the program-related image 66 associated with the foreground program in response to the reception of the notification. In this manner, the information associated with the program is updated successively.

FIG. 5 shows the board image 64 when the program information region 68 of the program-related image 66 shown in FIG. 6 is the display object area. An execution starting image as an object of operation when the execution of the foreground program associated with the board image 64 is started is included within the program information region 68. In the present embodiment, an execution start button image 72 (a default execution start button image 72 associated with the foreground program in this case) is disposed as the execution starting image within the program information region 68. The default execution start button image 72 is stored in the storage section 22 when the corresponding foreground program is installed on the information processing device 10, for example. The user gives an instruction to start the corresponding foreground program by tapping a display position of the execution start button image 72 in a state in which the board image 64 including the execution start button image 72 is displayed on the screen.

The image changing section 46 changes a display image between the menu image 60 set as a display object by the menu image display control section 42 and a plurality of board images 64 set as display objects by the board image display control section 44, according to a selecting operation by the user. For example, when the user selects a foreground program P1 in a state of the menu image 60 being displayed, the board image display control section 44 displays the board image 64 corresponding to the foreground program P1 on the screen. By performing a slide operation in the X-axis positive direction, for example, in this state, the user can display the menu image 60 on the screen again. When the user further selects another foreground program P2 in a state of the menu image 60 being displayed on the screen again, the board image display control section 44 displays the board image 64 corresponding to the foreground program P2. The user can thus sequentially display a plurality of board images 64 each corresponding to a foreground program on the screen. When the user performs an image changing operation (slide operation in the X-axis positive direction or the X-axis negative direction in the present embodiment), the image changing section 46 changes the image displayed on the screen, using, as objects of changing processing, the menu image 60 and the board images 64 set in a displayable state (for example the board images 64 associated with the foreground programs whose corresponding menu item images 62 are selected by the user).

In addition, in the present embodiment, suppose that the image changing section 46 displays a process of changing the display image on the screen. Specifically, for example, according to a slide operation in the X-axis positive direction (or in the X-axis negative direction), the image changing section 46 displays a state in which the image being displayed (which image will be referred to as a first image) is moving in the X-axis positive direction (or in the X-axis negative direction), and displays a state in which an image to be newly displayed (which image will be referred to as a second image) is coming into the screen from the side of the X-axis negative direction (or the side of the X-axis positive direction) following the moving first image. Then, when the user finishes the image changing operation by separating the finger from the touch sensor 28 after sliding the finger for a predetermined distance or more, the image changing section 46 further moves the first image and the second image until the whole of the second image comes into the screen. Thus, the image changing processing is ended, and only the second image is displayed within the screen.

Description in the following will be made of an example of states of screen changes in a case where the board image 64 corresponding to the foreground program P1 (which board image 64 will be referred to as a first board image 64) and the board image 64 corresponding to the foreground program P2 (which board image 64 will be referred to as a second board image 64) are set in a displayable state, for example. Incidentally, suppose in this case that the second board image 64 is set in a displayable state before the first board image 64. In the above-described case, when the user performs a slide operation in the X-axis negative direction in a state of the menu image 60 being displayed, a state in which the menu image 60 and the first board image 64 are moving from the right to the left is displayed, and then the first board image 64 is displayed on the entire screen. When the user then performs a slide operation in the X-axis negative direction in a state of the first board image 64 being displayed, a state in which the first board image 64 and the second board image 64 are moving from the right to the left is displayed, and then the second board image 64 is displayed on the entire screen. When the user then performs a slide operation in the X-axis positive direction in a state of the second board image 64 being displayed, a state in which the first board image 64 and the second board image 64 are moving from the left to the right is displayed, and then the first board image 64 is displayed on the entire screen. When the user then performs a slide operation in the X-axis positive direction in a state of the first board image 64 being displayed, a state in which the menu image 60 and the first board image 64 are moving from the left to the right is displayed, and then the menu image 60 is displayed on the entire screen.

The execution start managing section 48 starts the execution of a program stored in the storage section 22 or on the inserted medium (for example starts the program or resumes the execution of the program in the present embodiment). In the present embodiment, at a time of a start of the information processing device 10, the execution start managing section 48 starts one or plurality of background programs set in advance to be started at a time of a start of the information processing device 10. In addition, in the present embodiment, when the execution start managing section 48 receives an execution start instruction operation (for example an operation of tapping an execution start button image 72 in the present embodiment) by the user in a state in which a board image 64 as a part or the whole of the program-related image 66 corresponding to a foreground program is displayed on the screen, and when the program is in a suspended state (for example a state in which the control section 20 does not update a program counter for the program, a state in which the fetching, decoding, and execution of instructions included in the program are not performed, and the like), the execution start managing section 48 restarts (resumes) the execution of the foreground program. When the program is not in the suspended state, the execution start managing section 48 starts the foreground program. Incidentally, the start or the resumption of execution of the foreground program associated with the execution start button image 72 according to the operation by the user may be enabled only when the execution start button image 72 is displayed on the display section 26. Here, a program already started in the information processing device 10 may be ended as the execution start managing section 48 starts the program. This will be described later in detail. In addition, in the present embodiment, a program being executed may instruct the execution start managing section 48 to start a background program. According to the instruction to start the background program which instruction is received from the program being executed, the execution start managing section 48 starts the background program as an object of the start instruction.

In addition, in the present embodiment, when the execution start managing section 48 starts a program, the execution start managing section 48 stores information identifying the program (for example, the identifier of the program, the name of the program, or the like) and a parameter expireCount to which a predetermined value (for example 100 in the present embodiment) is set, in the storage section 22 in association with the program. In addition, in the present embodiment, when the execution start managing section 48 starts the program, the execution start managing section 48 decrements the values of parameters expireCount for other programs already started by one. The values of the parameters expireCount serve as a basis for the determination of order of priority for continuing the execution of the program. The parameters expireCount will be described later in detail.

Incidentally, in the present embodiment, when the execution start managing section 48 starts the program, the execution start managing section 48 checks whether or not execution condition data associated with the program is stored on the inserted medium. Then, when the execution condition data associated with the program is stored, the program is started using the execution condition data. Incidentally, the execution condition data will be described later in detail.

The program executing section 50 executes the program whose execution is started by the execution start managing section 48. In the present embodiment, the program executing section 50 for example displays an image of a processing result generated by executing the program whose execution is started (an image of a processing result generated by the program whose execution is started) on the screen. The user can thus give an instruction to perform various kinds of processing that can be performed by the started program.

In addition, the program executing section 50 may execute an instruction indicating a start or an end of a protection declaration of the program, which instruction is included in the program being executed on the information processing device 10 according to the present embodiment. Specifically, for example, in a chat program or the like, when conditions in which to prevent a chat program from being ended are started (when a chat is started, for example), the protection declaration of the chat program is started. When the conditions in which to prevent the chat program from being ended are ended (when the chat is ended, for example), the protection declaration of the chat program is ended. Then, the program executing section 50 manages whether or not the program being executed on the information processing device 10 is in a state of making the protection declaration. Specifically, for example, when the protection declaration of the program being executed is started, the program executing section 50 stores information including the identifying information of the program and a flag indicating that the program is making the protection declaration in the storage section 22. On the other hand, when the protection declaration of the program being executed is ended, the program executing section 50 deletes the information including the identifying information of the program and the flag indicating that the program is making the protection declaration, the information being stored in the storage section 22.

Figure 7:
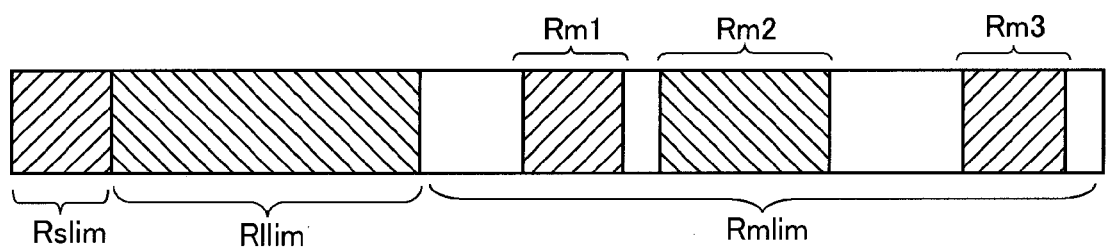
FIG. 7 is a diagram schematically showing an example of conditions of allocation of resources usable by programs executed on the information processing device according to the embodiment of the present invention.

The information processing device 10 according to the present embodiment can execute a plurality of programs simultaneously under a certain condition. FIG. 7 is a diagram schematically showing an example of conditions of allocation of resources (memory, file descriptors, and the like) usable by programs executed on the information processing device 10 when a plurality of programs are being executed simultaneously. As shown in FIG. 7, in the information processing device 10 according to the present embodiment, for example, an upper limit on resources of a fixed size is set to each of a system program that generates and outputs, for display, the menu image 60 and the board image 64 described above (which system program will hereinafter be referred to as a shell), a large program, and mini-programs. The shell executed on the information processing device 10 according to the present embodiment can use resources within the upper limit set to the shell. In the present embodiment, the menu image 60, the board image 64, the program-related image 66, the information of display elements disposed in the program-related image 66, and the like are managed as resources allocated to the shell. In addition, in the present embodiment, two or more large programs are not executed simultaneously, as described above. Hence, a large program executed on the information processing device 10 can use resources within the upper limit set to the large program. In addition, in the present embodiment, an upper limit on resources which upper limit is set to mini-programs is an upper limit on resources which upper limit is set to the whole of one or plurality of mini-programs executed on the information processing device 10. Therefore, the information processing device 10 according to the present embodiment can execute a plurality of mini-programs unless the upper limit on resources which upper limit is set to the whole of mini-programs is exceeded. In FIG. 7, a maximum resource size allocatable to the shell is shown as Rslim, a maximum resource size allocatable to a large program is shown as Rllim, and a maximum resource size allocatable to mini-programs is shown as Rmlim. In addition, resources used by a plurality of mini-programs (three mini-programs in the example of FIG. 7), respectively, executed on the information processing device 10 are shown as Rm1, Rm2, and Rm3.

The stop and end managing section 52 stops or ends the execution of an already started program when a predetermined condition is satisfied. In the following description, the stopping of the execution of a program will refer to setting the program in a suspended state, and the ending of the program will refer to ending the execution of the program and releasing the resources used by the program.

In the present embodiment, during the execution of a program (when an image of a processing result generated by executing the program is displayed on the screen), the user can perform an operation of suspending the program by performing an operation such as depressing a predetermined button 34 or the like. In the present embodiment, when the operation of suspending the program is performed, the following processing is performed: (1) processing of storing an image of a screen shot by the stop and end managing section 52; (2) processing of storing execution condition data and processing of stopping the execution of the program by the stop and end managing section 52; and (3) processing of changing the image displayed on the screen to the board image 64 corresponding to the program by the board image display control section 44.

In addition, in the processing shown in the above (1), the stop and end managing section 52 stores an image of a screen shot of the screen when the execution of the program is stopped (for example an image written in the frame buffer memory of the information processing device 10 when the execution of the program is stopped) in the storage section 22. Incidentally, at this time, the stop and end managing section 52 may store the image of the screen shot on the inserted medium.

In the processing shown in the above (2), the stop and end managing section 52 stores execution condition data, which is data indicating the execution conditions of the program when the execution of the program is stopped, on the inserted medium in association with information identifying the program (for example the identifier of the program, the name of the program, or the like), information indicating a date and time when the program is stopped, and the like, and stops the program. This sets the program in a suspended state. In addition, at this time, the resources used by the program are not released (that is, the program is not ended).

In the present embodiment, the stop and end managing section 52 for example stores data disposed in a part of memory used by the stopped program as execution condition data on the inserted medium (for example data disposed in a region within a range of predetermined logical addresses in a virtual address space allocated to the program (which region will hereinafter be referred to as a safe memory region)). In the present embodiment, the size of the safe memory region is 64 kilobytes, for example. Thus, in the present embodiment, the stop and end managing section 52 performs control to store the data disposed in the safe memory region on the inserted medium while retaining the data disposed in the memory region used by the stopped program.

In addition, in the processing shown in above (3), the board image display control section 44 generates the board image 64 including the image of the screen shot which image is stored in the storage section 22 by the stop and end managing section 52 as an execution start button image 72, and displays the board image 64 on the screen. Thus, the image displayed on the screen is changed to the board image 64 corresponding to the program. Thus, in the present embodiment, by viewing the execution start button image 72, the user can recognize that the execution of the program corresponding to the execution start button image 72 is stopped and recognize conditions when the execution of the program is stopped (set in a suspended state).

In addition, in the present embodiment, during the execution of the program (when an image of a processing result generated by executing the program is displayed on the screen), the user can perform an operation of ending the program by performing an operation such as depressing a predetermined button 34 or the like. In the present embodiment, when the operation of ending the program is performed, the stop and end managing section 52 ends the execution of the program set as an object of the ending operation, and releases the resources used by the program. Then, in the present embodiment, when the user explicitly gives an instruction to end the program, the program is ended after passing through a stopped state (suspended state). Therefore, when the program is ended as described above, the processing shown in the above (2) is performed for the program, and thereafter the resources used by the program are released.

In addition, for example, when the program executing section 50 executes an instruction to end the program being executed, the instruction being included in the program being executed itself, the stop and end managing section 52 ends the execution of the program, and releases the resources used by the program. Also at this time, the processing shown in the above (2) is performed for the program. In addition, for example, when the program executing section 50 executes an instruction to end another program (for example a background program) being executed, which instruction is included in the program being executed, the stop and end managing section 52 ends the execution of the other program, and releases the resources used by the other program. Also at this time, the processing shown in the above (2) is performed for the other program. In addition, when the ended program is a foreground program, the stop and end managing section 52 sets the board image 64 associated with the program ended according to the ending instruction in a non-displayable state. Then, the menu image display control section 42 displays the menu image 60 on the screen.

Because the board image 64 corresponding to the thus ended program is set in a non-displayable state, as described above, the board image 64 corresponding to the program is not displayed on the screen even when the user performs a screen changing operation after the program is end.

In addition, in the present embodiment, when the user performs an execution start instruction operation (for example an operation of tapping the execution start button image 72 in the present embodiment) in a state in which the board image 64 corresponding to the program in the suspended state is displayed on the screen, because the program is already started, the program is not started again. The execution start managing section 48 reproduces execution conditions when the operation of suspending the program was performed on the basis of the resources used by the program (for example the data retained in the memory), and resumes the execution of the program.

In addition, in a state in which one large program is already being executed, when another program is started, the stop and end managing section 52 ends the already started large program, and releases the resources used by the large program. In this case, the stop and end managing section 52 sets the board image 64 associated with the ended program in a non-displayable state. Incidentally, at this time, when ending the large program, the stop and end managing section 52 may inquire of the user whether or not to save the execution contents of the large program as save data. When the user selects the execution contents of the large program to be saved, the stop and end managing section 52 may output the save data to the inserted medium. Incidentally, at this time, the stop and end managing section 52 may store the data disposed in the safe memory region of the ended large program on the inserted medium.

Figure 8:
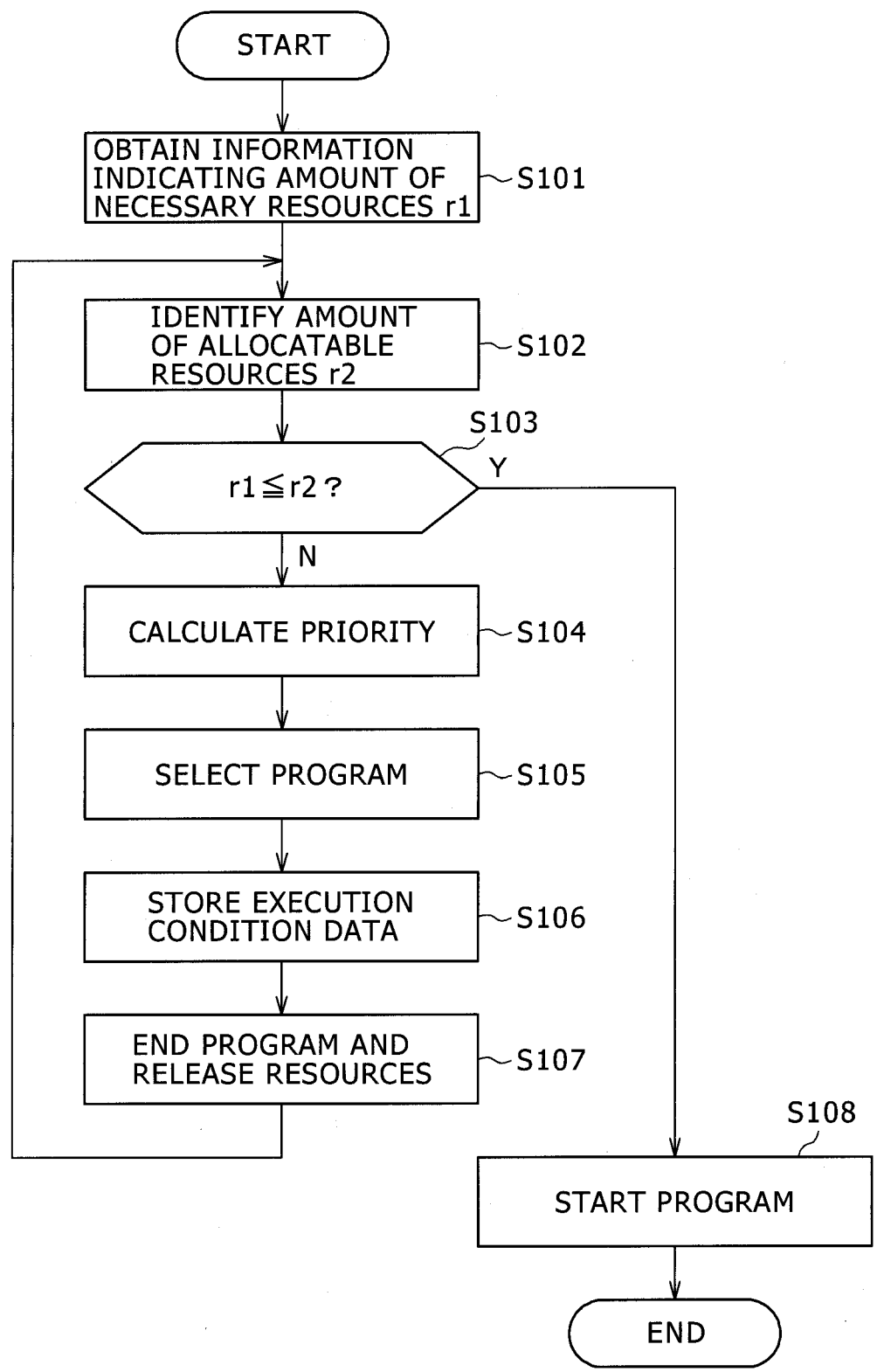
FIG. 8 is a flowchart of an example of a flow of processing performed in the information processing device according to the embodiment of the present invention.

In addition, when the execution start managing section 48 starts a mini-program, the stop and end managing section 52 ends an already started program as required. An example of a flow of processing performed in the information processing device 10 according to the present embodiment when the execution start managing section 48 starts a mini-program will be described in the following with reference to a flowchart of FIG. 8. Incidentally, suppose in the present embodiment that information indicating an amount of resources necessary to execute the mini-program to be started is stored in the storage section 22 or on the inserted medium in advance in association with the mini-program.

First, the stop and end managing section 52 obtains information indicating an amount of resources necessary to execute the mini-program to be started (amount of necessary resources r1) from the storage section 22 or the like (S101). Then, the stop and end managing section 52 identifies an amount of resources that are not used by programs currently being executed and are allocatable to the mini-program to be started (amount of allocatable resources r2) among resources allocated to the whole of mini-programs (S102).

Then, the stop and end managing section 52 determines whether or not the unused resources can be allocated to the mini-program to be started (for example whether the amount of necessary resources r1 is equal to or smaller than the amount of allocatable resources r2) (S103).

When the allocation is not possible (S103: N), the stop and end managing section 52 calculates a priority serving as a basis for the determination of order of priority for continuing program execution for each program being executed (which priority will hereinafter be referred to as an execution continuation priority) (S104). In the present embodiment, the stop and end managing section 52 calculates the execution continuation priority for each program being executed as follows. The stop and end managing section 52 first sets the value of a parameter expireCount stored for a program as an object of the calculation of the execution continuation priority (which program will hereinafter be referred to as a calculation object program) as an initial value of the execution continuation priority. Then, when the calculation object program is making a protection declaration, the stop and end managing section 52 adds 100000 to the value of the execution continuation priority. Further, when the calculation object program is a foreground program, and information generated by executing the calculation object program is displayed on the screen (information generated by the program is displayed on the screen), the stop and end managing section 52 adds 10000 to the value of the execution continuation priority. Further, when the calculation object program is a background application, the stop and end managing section 52 adds 1000 to the value of the execution continuation priority. The execution continuation priority is thus calculated for each program being executed.

The stop and end managing section 52 then selects a program having a smallest value of the execution continuation priority (S105). The stop and end managing section 52 then stores execution condition data for the selected program on the inserted medium in association with information identifying the program (for example the identifier of the program, the name of the program, or the like), information indicating a date and time when the program is ended, and the like (S106). Then, the stop and end managing section 52 ends the selected program and releases the resources used by the program (S107), and returns to the processing shown in S102. At this time, the resources managed by the shell for the program are not released. In addition, the board image 64 associated with the program is maintained in a displayable state. In addition, in the present processing example, when an image of a screen shot of the ended program is stored in the storage section 22, the stop and end managing section 52 erases the image from the storage section 22 in the processing shown in S107.

When it is determined in the processing shown in S103 that the allocation is possible (S103: Y), the execution start managing section 48 starts the program to be started (S108), and ends the processing shown in the present processing example.

The board image 64 corresponding to the thus ended program is maintained in a displayable state, as described above. Thus, when the user performs a screen changing operation after the program is ended, the board image 64 corresponding to the program (for example the board image 64 in which the default execution start button image 72 of the program is disposed) is displayed on the screen. In addition, in the present embodiment, for the program that is thus ended but whose board image 64 is maintained in a displayable state, the board image display control section 44 successively updates the information of display elements disposed in the program-related image 66 associated with the program, as described above.

When the user then performs an instruction operation for starting the execution of the program, the execution start managing section 48 obtains the execution condition data stored in association with the program, and starts the execution of the program on the basis of the execution condition data. In the present embodiment, when the program as the object of the execution starting instruction operation is already ended, and the resources used by the program are released, the execution start managing section 48 for example secures a memory region to be used by the program as the object of the execution starting instruction operation in the storage section 22, then obtains the execution condition data stored in association with the program as the object of the execution starting instruction operation, and disposes the execution condition data in a safe memory region within the virtual address space secured for the program. On the basis of the data thus disposed in the safe memory region, it is possible to reproduce a part or the whole of the execution conditions of the program, and start the execution of the program. At this time, the execution start managing section 48 may reproduce execution conditions when the program is ended last time on the basis of execution condition data stored when the program is ended last time (for example execution condition data output last to the inserted medium, execution condition data with which a latest date and time is associated, or the like) (for example dispose the execution condition data stored when the program is ended last time in the safe memory region), and start the execution of the program. In addition, the execution start managing section 48 may reproduce the execution conditions of the program when the program is ended before the last time on the basis of execution condition data stored when the program is ended before the last time (for example dispose the execution condition data stored when the program is ended before the last time in the safe memory region). In addition, the execution start managing section 48 may reproduce the execution conditions of the program on the basis of execution condition data specified by the user.

Incidentally, in the processing shown in S106 in the above-described processing example, the stop and end managing section 52 may not perform the processing of storing execution condition data on the inserted medium, for example. In addition, in the processing shown in S106 in the above-described processing example, when a foreground program in a suspended state is ended, and the data disposed in the safe memory region of the program is changed from the execution condition data stored on the inserted medium for the program (that is, when the contents of the data disposed in the safe memory region are changed from the execution condition data stored on the inserted medium last time), the stop and end managing section 52 may perform the processing of storing execution condition data on the inserted medium. When the data disposed in the safe memory region of the program is not changed from the execution condition data stored on the inserted medium for the program (that is, when the contents of the data disposed in the safe memory region are not changed from the execution condition data stored on the inserted medium last time), the stop and end managing section 52 may not perform the processing of storing execution condition data on the inserted medium.

In addition, in the processing shown in S107 in the above-described processing example, the image of the screen shot of the ended program may not be erased from the storage section 22. Then, the image of the screen shot stored in association with the execution condition data may be disposed as the execution start button image 72 within the board image 64 of the ended program.

In the present embodiment, when the execution of a program in a suspended state is resumed by an operation of tapping the execution start button image 72 by the user, or when execution condition data is disposed from the inserted medium into the safe memory region and the program is started, the board image display control section 44 performs control to enlarge the execution start button image 72 of the program (for example the default execution start button image 72 of the program or the image of the screen shot of the program) so that the execution start button image 72 of the program is displayed on the entire screen. Then, the board image display control section 44 maintains a state in which the image controlled so as to be displayed on the entire screen is displayed on the screen until processing (preparation processing) necessary to start the execution of the program is ended (for example until the generation of an image to be displayed immediately after an end of the preparation processing for the execution of the program is ended). Then, when the preparation processing for the execution of the program is ended, and an image of a processing result generated by executing the program (image of a processing result generated by the program) is displayed on the screen, the image displayed on the screen is changed from the image of the screen shot to the image of the processing result generated by the program.

Thus, in the present embodiment, during a start of execution of a program (for example during a start or during resumption of execution from a suspended state), an image of a screen shot of the screen when the execution of the program is stopped is controlled to be displayed on the display section 26.

In addition, in the present embodiment, when the execution of the program is resumed from the suspended state, the information processing device 10 notifies the program executing section 50 that the execution of the program is resumed from the suspended state. This makes it possible to perform processing that should be performed when the program is resumed.

In addition, in the present embodiment, at the time of the start of the program or at the time of resumption of the execution of the program, the information processing device 10 notifies the program executing section 50 whether the program is started after the board image is set in a non-displayable state or the program is started with the board image maintained in a displayable state. This enables the program executing section 50 to perform different processing depending on whether the program is started after the board image is set in a non-displayable state or the program is started with the board image maintained in a displayable state.

As described above, in the present embodiment, the stop and end managing section 52 selects a program to be ended from among a plurality of programs on the basis of the execution continuation priority associated with each program. The stop and end managing section 52 then ends the selected program. At this time, as described above, the stop and end managing section 52 ends a program not making a protection declaration more preferentially than a program making a protection declaration. In addition, the stop and end managing section 52 ends a program different from a foreground program that generates information being displayed more preferentially than the foreground program that generates the information being displayed. In addition, the stop and end managing section 52 ends a background program more preferentially than the foreground program that generates the information being displayed. In addition, the stop and end managing section 52 ends a foreground program different from the foreground program that generates the information being displayed more preferentially than background programs.

In addition, in the present embodiment, when the user performs an operation of closing a board image 64 corresponding to a program in a suspended state (program whose resources used during execution are not released) in a state of the board image 64 being displayed on the screen (for example the user performs an operation of sliding a finger or the like from an upper right edge to a lower left edge in a state of the finger or the like being in contact with the touch sensor 28), the stop and end managing section 52 ends the execution of the program corresponding to the board image 64, and releases the resources used by the program. At this time, in the present embodiment, because the data disposed in the safe memory region of the program is already stored on the inserted medium when the program is set in the suspended state, the storing of the data disposed in the safe memory region of the program onto the inserted medium is not performed. In addition, the stop and end managing section 52 sets the closed board image 64 in a non-displayable state. The menu image display control section 42 then displays the menu image 60 on the screen. Incidentally, instead of the menu image display control section 42 displaying the menu image 60 on the screen, the board image display control section 44 may display another board image 64 on the screen. When the user then taps a menu item image 62 corresponding to the closed board image 64 again while the menu image 60 is displayed on the screen, the board image display control section 44 displays the board image 64 on the screen. In the present embodiment, the board image 64 includes a default execution start button image 72.

In addition, in the present embodiment, an upper limit (for example six) on the number of board images 64 as display objects (board images 64 that can be displayed by changing a display image) is set in advance. Then, when the execution start managing section 48 starts a program that, by being started, causes the number of board images 64 as display objects to exceed the upper limit (for example a program that, by being started, causes the number of board images 64 as display objects to become seven), the stop and end managing section 52 ends a foreground program whose corresponding board image 64 was last tapped at an earliest date and time among foreground programs that are already started and are not making a protection declaration.

In addition, in the present embodiment, in a case where the information processing device 10 ended abnormally, the information processing device 10 erases the execution condition data stored on the inserted medium when thereafter started. In a case where a unique value such as a date and time of a start of the information processing device 10 is included in the file name of the execution condition data, for example, the information processing device 10 at a time of a start of the information processing device 10 may erase execution condition data including a value different from a unique value associated with the start as a file name.

In the information processing device 10 according to the present embodiment, even when a program is ended, a board image 64 associated with the ended program is maintained in a displayable state. Thus, even when an already started program is ended as a new program is started, a state is maintained in which the user can display a board image 64 in which information related to the ended program is disposed on the screen.

It is to be noted that the present invention is not limited to the foregoing embodiment.

For example, the stop and end managing section 52 may store the data disposed in the safe memory region of a stopped program as execution condition data in the storage section 22 (for example a memory outside the region used by the program, a flash memory included in the information processing device 10, or the like) rather than on the inserted medium.

In addition, for example, the information processing device 10 may perform control as to whether to store the data disposed in the safe memory region of the program as execution condition data on the inserted medium or in the storage section 22 according to the type of the program. For example, the information processing device 10 may perform control so as to store the data disposed in the safe memory region of the program of a system application in the storage section 22 when the system application is stopped, and perform control so as to store the data disposed in the safe memory region of the program of a game application on the inserted medium when the game application is stopped.

In addition, for example, when storing execution condition data on the inserted medium, the information processing device 10 may store the execution condition data after encrypting the execution condition data. When storing execution condition data in the storage section 22, the information processing device 10 may store the execution condition data without encrypting the execution condition data.

In addition, for example, when a program is stopped (set in a suspended state), the stop and end managing section 52 may not store the data disposed in the safe memory region of the program as execution condition data on the inserted medium. Instead, when the program is ended (that is, when the resources used by the program is released), the stop and end managing section 52 may store the data disposed in the safe memory region of the program as execution condition data on the inserted medium.

In addition, for example, in a case where execution condition data associated with a program is not stored when the program is started, the information processing device 10 may generate the execution condition data of the program which execution condition data is associated with information identifying the program (for example the identifier of the program, the name of the program, or the like), information indicating the date and time of the start of the program, or the like (for example execution condition data as a file generated by copying the data disposed in the safe memory region of the program at the start of the program), and store the execution condition data on the inserted medium. When the program is then stopped, the information processing device 10 may update the execution condition data stored on the inserted medium to execution condition data representing the execution conditions of the program when the program is stopped.

In addition, when updating execution condition data stored on the inserted medium, the information processing device 10 may start the update after setting the execution condition data in a corrupted state (for example changing information associated with the execution condition data (for example renaming the file name of the execution condition data)), and restore the execution condition data set in the corrupted state (for example restore the information associated with the execution condition data (for example restore the file name of the execution condition data)) when the update is ended. In this manner, for example, by checking that the execution condition data stored on the inserted medium is in the corrupted state, the information processing device 10 can detect that the updating of the execution condition data is unfinished because the inserted medium is extracted while the data is being updated, for example. Then, the information processing device 10 may perform control to discard the execution condition data without disposing the execution condition data in the safe memory region.

Incidentally, when it is checked that the execution condition data stored on the inserted medium is in the corrupted state, the information processing device 10 may perform operation according to the type of the program associated with the execution condition data. For example, in a case where the execution condition data of the system program is in a corrupted state when the system program is started, the information processing device 10 may start the system program after disposing the execution condition data in the safe memory region. At this time, for example, the corrupted execution condition data may be handled by the system program. In addition, for example, in a case where the execution condition data of a game program is in a corrupted state when the game program is started, the information processing device 10 may discard the data. At this time, for example, the information processing device 10 may generate the execution condition data of the program and store the execution condition data on the inserted medium when starting the game program.

In addition, the size of the safe memory region may be determined on the basis of the type of the program (type of the application), or may be settable for each application by the user. In addition, for example, the safe memory region may be divided into blocks of about a few kilobytes. Then, when a foreground program is set in a suspended state or ended, the stop and end managing section 52 may write a block in which the contents of data are changed from the execution condition data stored for the program on the inserted medium (that is, a block in which the contents of data are changed from the execution condition data stored onto the inserted medium last time) to the inserted medium (update the block in the stored execution condition data). Incidentally, the size of the blocks may be determined on the basis of the cluster size of the inserted medium, for example.

In addition, the information processing device 10 may erase the execution condition data stored on the inserted medium or in the storage section 22 (or set the execution condition data in a corrupted state or the like, or set the execution condition data in a state of being prevented from being disposed in the safe memory region) according to a request from the user. In addition, the information processing device 10 may for example store execution condition data in association with the version information of a program. Then, when a program in a version different from that of the stored execution condition data is started, the information processing device 10 may erase the execution condition data (or set the execution condition data in a corrupted state or the like, or set the execution condition data in a state of being prevented from being disposed in the safe memory region).

In addition, for example, when the user performs an operation of closing a board image 64 corresponding to a suspended program in a state of the board image 64 being displayed on the screen, the stop and end managing section 52 may store execution condition data representing execution conditions when the closing operation is performed for the program corresponding to the board image 64 onto the inserted medium in association with information identifying the program, information indicating a date and time when the program is ended, an image of a screen shot of the screen when the closing operation is performed, and the like. When the user then taps a menu item image 62 corresponding to the board image 64 again while the menu image 60 is displayed on the screen, the board image display control section 44 may display the board image 64 including the above-described image of the screen shot as an execution start button image 72 on the screen. Then, when the user performs an instruction operation for starting the execution of the program for which the closing operation was performed, the execution start managing section 48 may obtain the execution condition data stored in association with the program, reproduce the execution conditions of the program on the basis of the execution condition data, and resume the execution of the program.

In addition, for example, when another large program is started in a state of a large program already being executed, the stop and end managing section 52 may end the already started large program and release the resources used by the large program, and store the execution condition data of the large program onto the inserted medium in association with information identifying the program, information indicating a date and time when the program is ended, an image of a screen shot of the screen, and the like. When the user then taps a menu item image 62 corresponding to the ended large program again while the menu image 60 is displayed on the screen, the board image display control section 44 may display the board image 64 including the above-described image of the screen shot as an execution start button image 72 on the screen. Then, when the user performs an instruction operation for starting the execution of the ended large program, the execution start managing section 48 may obtain the execution condition data stored in association with the program, reproduce the execution conditions of the program on the basis of the execution condition data, and start the execution of the program.

In addition, for example, the information processing device 10 may store data indicating whether or not a program corresponding to a board image 64 has been started after the board image 64 is set in a displayable state (including a case where the board image 64 is set in a displayable state for the first time after a start of the information processing device 10 and a case where the board image 64 set in a displayable state is set in a non-displayable state and thereafter set in a displayable state again). The data is for example a flag associated with the identifying information of the program. The flag is "0" in an initial state. The value of the flag is updated to "1" when the program is started for the first time after the board image 64 corresponding to the program is set in a displayable state. The value of the flag is updated to "0" when the board image 64 is thereafter set in a non-displayable state.

Then, in a case where it is determined on the basis of the above-described flag or the like that the program corresponding to the board image 64 has not been started after the board image 64 is set in a displayable state (for example in a case where the value of the flag is "0"), the information processing device 10 may dispose a default execution start button image 72 in the board image 64. In addition, when the user performs an instruction operation for starting the execution of the program, in a case where it is determined on the basis of the above-described flag or the like that the program corresponding to the board image 64 has not been started after the board image 64 is set in a displayable state (for example in a case where the value of the flag is "0"), the information processing device 10 may start the execution of the program in conditions similar to those at a time of a first start even when execution condition data associated with the program is stored on the inserted medium. On the other hand, in a case where it is determined that the program corresponding to the board image 64 has been started after the board image 64 is set in a displayable state (for example in a case where the value of the flag is "1"), the information processing device 10 may dispose an image of a screen shot as an execution start button image 72 in the board image 64. In addition, when the user performs an instruction operation for starting the execution of the program, in a case where it is determined on the basis of the above-described flag or the like that the program corresponding to the board image 64 has been started after the board image 64 is set in a displayable state (for example in a case where the value of the flag is "1"), the information processing device 10 may reproduce the execution conditions of the program on the basis of the execution condition data associated with the program, and start the execution of the program.

In addition, for example, the program executing section 50 may store images of a plurality of screen shots of the screen in timing in which an operation of suspending a program is performed (for example an image of a screen shot of the entire screen and an image of a screen shot of a part of the screen or the like) in the storage section or on the inserted medium. Then, the image of the screen shot disposed as an execution start button image 72 within a board image 64 may be different from the image of the screen shot displayed on the screen in resuming the execution of the program until preparation processing for the resumption is ended (for example until the generation of an image to be displayed after the resumption is ended).

Incidentally, a method of managing classifications of programs is not particularly limited. For example, a program itself stored in the storage section 22 or on the inserted medium may include information indicating that the program is a large program or a mini-program and information indicating that the program is a foreground program or a background program, or information associating the identifier of the program with the classification of the program (one of a large program and a mini-program and one of a foreground program and a background program) may be stored in the storage section 22.

In addition, a method of managing whether or not a program is in a displayable state is not particularly limited. For example, for a program that has been executed on the information processing device 10 once, information identifying the program and a flag indicating whether or not the board image 64 associated with the program is in a displayable state (for example a flag whose value 1 indicates a displayable state and whose value 0 indicates a non-displayable state) may be stored in the storage section 22 or on the inserted medium in association with each other.

In addition, the stop and end managing section 52 may end a program having a smallest value of the execution continuation priority which program is selected as described above when an upper limit on a CPU usage amount or an upper limit on a maximum number of simultaneously executed programs is exceeded, for example.

In addition, for example, when the user performs an operation of suspending a program by performing an operation such as depressing a predetermined button 34 or the like, the menu image display control section 42 may change the image displayed on the screen to the menu image 60.

In addition, for example, in a case where an image of a screen shot of a program is stored in the information processing device 10 when the execution of the program is ended and the resources used by the program are released, the information processing device 10 may erase the image.

In addition, for example, when the execution of a program in a suspended state is resumed, or when a program whose execution condition data is disposed from the inserted medium into the safe memory region is started, an image for starting which image is stored into the storage section 22 when the program is installed onto the information processing device 10 may be displayed until preparation processing for the execution of the program is ended.

In addition, when an operation of suspending a program is performed, the stop and end managing section 52 may not store an image of a screen shot depending on the type of the program. Specifically, for example, when the execution of a moving image reproducing application is stopped, an image of a screen shot may not be stored. In this case, the board image display control section 44 may dispose a blank image or an image in one color of black as an execution start button image 72. Incidentally, while the program executing section 50 is executing the moving image reproducing application (for example reproducing a moving image), the program executing section 50 may notify the stop and end managing section 52 to an effect that the obtainment of an image of a screen shot is prohibited. Then, while the board image display control section 44 is receiving the notification (that is, while the moving image is being reproduced), the board image display control section 44 may perform control not to dispose an image of a screen shot as an execution start button image 72 even when the moving image reproducing application is stopped and set in a suspended state. In addition, for example, while the program executing section 50 is executing the moving image reproducing application (for example reproducing a moving image), the program executing section 50 may notify the board image display control section 44 to an effect that the display of an image of a screen shot is prohibited. Then, while the board image display control section 44 is receiving the notification (that is, while the moving image is being reproduced), the board image display control section 44 may perform control not to display an image of a screen shot as an execution start button image 72 even when the execution of the moving image reproducing application is stopped and set in a suspended state. Incidentally, when the execution of the moving image reproducing application is stopped and set in a suspended state as described above, the board image display control section 44 may dispose, as an execution start button image 72 within the board image 64, an image showing that the reproduction of the moving image is being executed, which image showing that the reproduction of the moving image is being executed is different from an image disposed as an execution start button image 72 within the board image 64 before a start of the moving image reproducing application (which image showing that the reproduction of the moving image is being executed is stored into the storage section 22 or the like at a time of installation of the moving image reproducing application, for example).

In addition, the board image display control section 44 may dispose an image of a screen shot as an execution start button image 72 in a display mode corresponding to conditions of progress of the program after being set in a suspended state (for example a display mode corresponding to a time after the program is set in a suspended state). For example, a color image may be disposed as an execution start button image 72 until a predetermined time has passed from the setting of the program in the suspended state, and a monochrome image may be disposed as an execution start button image 72 after the passage of the predetermined time from the setting of the program in the suspended state.

In addition, for example, when a program is stopped, an image of a screen shot in timing different from that of the stopping of the program may be stored. Then, the image may be displayed on the display section 26 during a start of execution of the program (for example during a start or during resumption of execution from a suspended state).

In addition, the information processing device 10 may include for example a hard disk drive, a microphone, a speaker, a camera, an acceleration sensor, and the like.

In addition, the above-described information processing device 10 may be formed of a plurality of casings (for example an information processing terminal and a server that can communicate with each other). Then, the processing performed in the above-described information processing device 10 may be performed in such a manner as to be shared between the information processing terminal and the server. For example, the server may generate a page associated with a menu image 60 and a board image 64, and output the page to the information processing terminal. The information processing terminal may then display the page received from the server on the display or the like.

In addition, the above concrete character strings and the concrete character strings in the drawings are illustrative, and are not limited to these character strings.

The invention claimed is:

1. An information processing device comprising:
a display screen;

a touch sensor;
an operation receiving section configured to receive instruction operations on the touch sensor;
a menu image display control section configured to display a menu of programs for selection by a user;
a board image display control section configured to generate a board image comprising information related to a selected program, wherein said board image is displayed on said display screen when said program is selected, wherein said board image comprises: (i) a program information region in which information about the selected program is displayed, said program information region comprising an execution start button configured to start the selected program, and (ii) a communication region in which contents of messages posted by a plurality of users in relation to the selected program is displayed, wherein said communication region is updated with newly arrived messages; and
a stop and end managing section configured to execute a suspend operation, wherein when the suspend operation is executed the information processing device stores an image of a screen shot of a program being suspended, stores execution condition data of the program being suspended, and changes an image displayed on the display screen of said information processing device to a program-related image of the program being suspended,
wherein the stop and end managing section calculates a priority for continuing program execution for each program being executed on said information processing device when there are insufficient resources available to execute all of said programs,
wherein said priority is determined by setting a parameter value associated with each program as an initial priority value, wherein said initial priority value is: (i) increased by a first amount when the program is protected by a protection declaration, (ii) increased by a second amount that is lower than said first amount when the program is a foreground program, and increased by a third amount that is lower than said second amount when the program is a background application, wherein the program with a lowest priority value is ended and its resources released for use by programs with higher priority,
wherein the board image associated with the program that is ended is maintained in a displayable state.

2. The information processing device according to claim 1, wherein when the program being executed is set in a suspended state, a storing control unit performs control to store data disposed in a region within a range of predetermined logical addresses, the region being used by the program.

3. The information processing device according to claim 1, wherein when the program being executed is set in a suspended state, a storing control unit performs control to store data disposed in a memory region used by the program in a case where the data is changed from data stored when the program was set in the suspended state last time, and does not perform control to store the data disposed in the memory region used by the program in a case where the data is not changed from the data stored when the program was set in the suspended state last time.

4. The information processing device according to claim 1, wherein in a case where the information processing device ended abnormally, when the information processing device is started after ending abnormally, a storing control unit erases the data controlled to be stored when the execution of the program is stopped.

5. An information processing device comprising:
a display screen;
a touch sensor;
an operation receiving section configured to receive instruction operations on the touch sensor;
a menu image display control section configured to display a menu of programs for selection by a user;
a board image display control section configured to generate a board image comprising information related to a selected program, wherein said board image is displayed on said display screen when said program is selected, wherein said board image comprises: (i) a program information region in which information about the selected program is displayed, said program information region comprising an execution start button configured to start the selected program, and (ii) a communication region in which contents of messages posted by a plurality of users in relation to the selected program is displayed, wherein said communication region is updated with newly arrived messages;
a readout control unit configured to start the selected program, and in a case where data controlled to be stored in association with the selected program while retained in a memory region used by the selected program when the selected program was set in a suspended state is stored, read out the data and dispose the data in the memory region used by the selected program; and
a stop and end managing unit configured to execute a suspend operation, wherein when the suspend operation is executed the information processing device stores an image of a screen shot of a program being suspended, stores execution condition data of the program being suspended, and changes an image displayed on the screen of said information processing device to a program-related image of the program being suspended,
wherein the stop and end managing section calculates a priority for continuing program execution for each program being executed on said information processing device when there are insufficient resources available to execute all of said programs,
wherein said priority is determined by setting a parameter value associated with each program as an initial priority value, wherein said initial priority value is: (i) increased by a first amount when the program is protected by a protection declaration, (ii) increased by a second amount that is lower than said first amount when the program is a foreground program, and increased by a third amount that is lower than said second amount when the program is a background application, wherein the program with a lowest priority value is ended and its resources released for use by programs with higher priority,
wherein the board image associated with the program that is ended is maintained in a displayable state.

6. The information processing device according to claim 5, further comprising:
an execution start control unit configured to secure the memory region used by the selected program in a case where the memory region used at a time of a past execution of the selected program is released when the program is started;

wherein, in a case where the data controlled to be stored in association with the selected program is stored when the execution start control unit secures the memory region, the readout control unit reads out the data and disposes the data in the memory region.

7. An information processing device comprising:
a display screen;
a touch sensor;
an operation receiving section configured to receive instruction operations on the touch sensor;
a menu image display control section configured to display a menu of programs for selection by a user;
a board image display control section configured to generate a board image comprising information related to a selected program, wherein said board image is displayed on said display screen when said program is selected, wherein said board image comprises: (i) a program information region in which information about the selected program is displayed, said program information region comprising an execution start button configured to start the selected program, and (ii) a communication region in which contents of messages posted by a plurality of users in relation to the selected program is displayed, wherein said communication region is updated with newly arrived messages;
a storing control unit configured to, when a program being executed is set in a suspended state, perform control to store a part of data disposed in a memory region used by the program being executed in association with the program being executed while retaining the data;
a readout control unit configured to start the selected program, and in a case where the data controlled to be stored in association with the selected program by the storing control unit is stored, read out the data and dispose the data in the memory region used by the selected program; and
a stop and end managing unit configured to execute a suspend operation, wherein when the suspend operation is executed the information processing device stores an image of a screen shot of a program being suspended, stores execution condition data of the program being suspended, and changes an image displayed on the display screen of said information processing device to a program-related image of the program being suspended,
wherein the stop and end managing section calculates a priority for continuing program execution for each program being executed on said information processing device when there are insufficient resources available to execute all of said programs,
wherein said priority is determined by setting a parameter value associated with each program as an initial priority value, wherein said initial priority value is: (i) increased by a first amount when the program is protected by a protection declaration, (ii) increased by a second amount that is lower than said first amount when the program is a foreground program, and increased by a third amount that is lower than said second amount when the program is a background application, wherein the program with a lowest priority value is ended and its resources released for use by programs with higher priority,
wherein the board image associated with the program that is ended is maintained in a displayable state.

8. An information processing method comprising:
displaying a menu of programs for selection by a user;
generating a board image comprising information related to a selected program, wherein said board image is displayed on a display screen of an information processing device when said program is selected, wherein said board image comprises: (i) a program information region in which information about the selected program is displayed, said program information region comprising an execution start button configured to start the selected program, and (ii) a communication region in which contents of messages posted by a plurality of users in relation to the selected program is displayed, wherein said communication region is updated with newly arrived messages;
a storing control step of, when a program being executed is set in a suspended state, performing control to store a part of data disposed in a memory region used by the program being executed in association with the program being executed while retaining the data; and
executing a suspend operation, wherein when the suspend operation is executed an image of a screen shot of a program being suspended is stored, execution condition data of the program being suspended is stored, and a program-related image of the program being suspended is displayed;
calculating a priority for continuing program execution for each program being executed on said information processing device when there are insufficient resources available to execute all of said programs,
wherein said priority is determined by setting a parameter value associated with each program as an initial priority value, wherein said initial priority value is: (i) increased by a first amount when the program is protected by a protection declaration, (ii) increased by a second amount that is lower than said first amount when the program is a foreground program, and increased by a third amount that is lower than said second amount when the program is a background application, wherein the program with a lowest priority value is ended and its resources released for use by programs with higher priority,
wherein the board image associated with the program that is ended is maintained in a displayable state.

9. An information processing method comprising:
displaying a menu of programs for selection by a user;
generating a board image comprising information related to a selected program, wherein said board image is displayed on a display screen of an information processing device when said program is selected, wherein said board image comprises: (i) a program information region in which information about the selected program is displayed, said program information region comprising an execution start button configured to start the selected program, and (ii) a communication region in which contents of messages posted by a plurality of users in relation to the selected program is displayed, wherein said communication region is updated with newly arrived messages;
starting the selected program, and in a case where data controlled to be stored in association with the selected program while retained in a memory region used by the selected program when the selected program was set in a suspended state is stored, reading out the data and disposing the data in the memory region used by the selected program;
executing a suspend operation, wherein when the suspend operation is executed an image of a screen shot of a program being suspended is stored, execution condition data of the program being suspended is stored, and a program-related image of the program being suspended is displayed; and calculating a priority for continuing program execution for each program being executed on said information processing device when there are insufficient resources available to execute all of said programs, wherein said priority is determined by setting a parameter value associated with each program as an initial priority value, wherein said initial priority value is: (i) increased by a first amount when the program is protected by a protection declaration, (ii) increased by a second amount that is lower than said first amount when the program is a foreground program, and increased by a third amount that is lower than said second amount when the program is a background application, wherein the program with a lowest priority value is ended and its resources released for use by programs with higher priority, wherein the board image associated with the program that is ended is maintained in a displayable state.

10. A non-transitory, computer readable information storage medium storing a program, the program displaying a menu of programs for selection by a user;

the program generating a board image comprising information related to a selected program, wherein said board image is displayed on a display screen of an information processing device when said program is selected, wherein said board image comprises: (i) a program information region in which information about the selected program is displayed, said program information region comprising an execution start button configured to start the selected program, and (ii) a communication region in which contents of messages posted by a plurality of users in relation to the selected program is displayed, wherein said communication region is updated with newly arrived messages;

the program making a computer function as a storing control unit configured to, when a program being executed is set in a suspended state, perform control to store a part of data disposed in a memory region used by the program being executed in association with the program being executed while retaining the data, wherein said program being executed is configured to execute a suspend operation, wherein when the suspend operation is executed the computer readable information storage medium is used to store: (1) an image of a screen shot of a program being suspended, (2) execution condition data of the program being suspended, and (3) and a program-related image of the program being suspended;

the program calculating a priority for continuing program execution for each program being executed on said information processing device when there are insufficient resources available to execute all of said programs, wherein said priority is determined by setting a parameter value associated with each program as an initial priority value, wherein said initial priority value is: (i) increased by a first amount when the program is protected by a protection declaration, (ii) increased by a second amount that is lower than said first amount when the program is a foreground program, and increased by a third amount that is lower than said second amount when the program is a background application, wherein the program with a lowest priority value is ended and its resources released for use by programs with higher priority, wherein the board image associated with the program that is ended is maintained in a displayable state.

11. A non-transitory, computer readable information storage medium storing a program, the program displaying a menu of programs for selection by a user;

the program generating a board image comprising information related to a selected program, wherein said board image is displayed on a display screen of an information processing device when said program is selected, wherein said board image comprises: (i) a program information region in which information about the selected program is displayed, said program information region comprising an execution start button configured to start the selected program, and (ii) a communication region in which contents of messages posted by a plurality of users in relation to the selected program is displayed, wherein said communication region is updated with newly arrived messages;

the program making a computer function as a readout control unit configured to start the selected program, and in a case where data controlled to be stored in association with the selected program while retained in a memory region used by the selected program when the selected program was set in a suspended state is stored, read out the data and dispose the data in the memory region used by the selected program, wherein said selected program is configured to execute a suspend operation, wherein when the suspend operation is executed the computer readable information storage medium is used to store: (1) an image of a screen shot of program being suspended, (2) execution condition data of the program being suspended, and (3) a program-related image of the program being suspended;

the program calculating a priority for continuing program execution for each program being executed on said information processing device when there are insufficient resources available to execute all of said programs, wherein said priority is determined by setting a parameter value associated with each program as an initial priority value, wherein said initial priority value is: (i) increased by a first amount when the program is protected by a protection declaration, (ii) increased by a second amount that is lower than the first amount when the program is a foreground program, and increased by a third amount that is lower than the second amount when the program is a background application, wherein the program with a lowest priority value is ended and its resources released for use by programs with higher priority, wherein the board image associated with the program that is ended is maintained in a displayable state.

* * * * *